(No Model.)

L. A. WHITE.
STOVE.

No. 286,664. Patented Oct. 16, 1883.

WITNESSES:
Wm. L. Crafo,
C. H. Leuthn Jr.

INVENTOR:
Leonard A. White
by Joseph A. Miller & Co
Att'ys

UNITED STATES PATENT OFFICE.

LEONARD A. WHITE, OF TAUNTON, MASSACHUSETTS.

STOVE.

SPECIFICATION forming part of Letters Patent No. 286,664, dated October 16, 1883.

Application filed January 2, 1883. (No model.)

*To all whom it may concern:*

Be it known that I, LEONARD A. WHITE, of Taunton, in the county of Bristol and State of Massachusetts, have invented a new and useful Improvement in Stoves and Ranges; and I hereby declare that the following is a full, clear, and exact description of the same, reference being had to the accompanying drawings, forming part of this specification.

This invention relates to an improvement in stoves or ranges, in the oven of which it is placed; and it consists in the peculiar construction of the device, as will be more fully set forth hereinafter, and pointed out in the claims.

Figure 1:
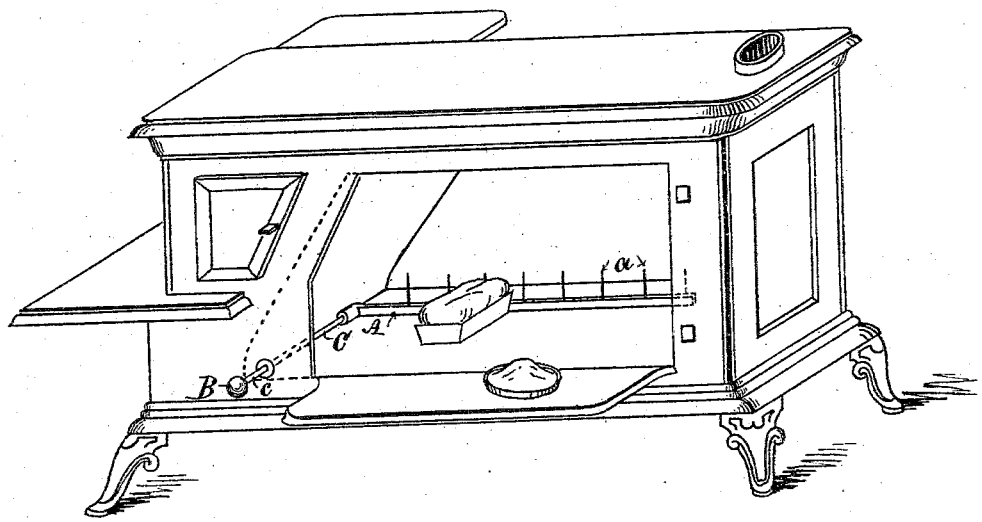
Figure 2:
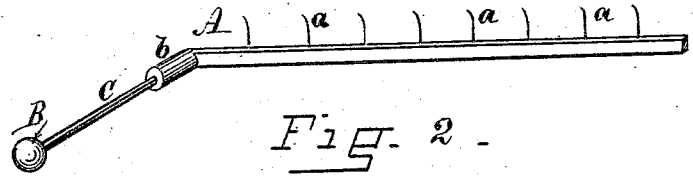

Figure 1 is a perspective view of a stove, showing the device as applied to the oven and a pan in the act of being removed by it. Fig. 2 is a perspective view of the device, showing the construction of the same.

In the drawings, A is a cast-metal bar of a length to fit the inside of the oven loosely, and in which at intervals are placed prongs $a$. The prongs are intended to support the top of a bowl or other high article while it is being drawn onto the shelf from the oven by the knob B being pulled.

C is a rod, on one end of which the knob B is secured. The other end of the rod is fastened into the boss $b$ on the end bar, A.

To place my improved device into the oven for removing hot plates, bowls, or other dishes without putting the hand into the oven, I first put the bar A in the oven, then pass the rod C, on which the knob B is formed, through the hole $c$, made in one side of the stove or range, close to the door. I then screw or otherwise fasten the rod C to the bar A, so that by pulling on the knob B anything that is in the oven will be moved out onto the shelf.

As will be seen by the drawings, my device can be placed on stoves and ranges as at present manufactured by simply boring a hole through the side of the stove or range to the left of the door.

Having thus described my invention, I claim as new and desire to secure by Letters Patent—

1. The combination, with the oven of a stove or range, of the bar A, placed inside of the oven and connected with the rod C, extending through the side of the stove or range, and the handle B, placed outside the same, constructed to operate the bar A, to remove articles from the oven, as described.

2. In a device for removing hot plates, dishes, and other similar articles from the oven of a stove or range, the bar A, having prongs or projections on its upper edge, connected by the rod C, passing through the side of said stove or range, and provided with the knob B, as described.

LEONARD A. WHITE.

Witnesses:
J. A. MILLER, Jr.,
HENRY J. MILLER.